United States Patent
Merlino et al.

(10) Patent No.: US 10,138,780 B2
(45) Date of Patent: Nov. 27, 2018

(54) METHOD OF OPERATING AN AUTOMOTIVE SYSTEM

(71) Applicant: GM GLOBAL TECHNOLOGY OPERATIONS LLC, Detroit, MI (US)

(72) Inventors: Gennaro Merlino, Turin (IT); Jaime Andres Cespedes Garcia, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 113 days.

(21) Appl. No.: 15/235,784

(22) Filed: Aug. 12, 2016

(65) Prior Publication Data

US 2017/0044946 A1    Feb. 16, 2017

(30) Foreign Application Priority Data

Aug. 13, 2015 (GB) .................... 1514392.8

(51) Int. Cl.
| | |
|---|---|
| *F01N 3/00* | (2006.01) |
| *F01N 3/08* | (2006.01) |

(Continued)

(52) U.S. Cl.
CPC ........... *F01N 3/0885* (2013.01); *F01N 3/035* (2013.01); *F01N 3/0814* (2013.01); *F01N 3/2066* (2013.01); *F01N 9/005* (2013.01); *F02D 41/0275* (2013.01); *F01N 2250/02* (2013.01); *F01N 2250/12* (2013.01); *F01N 2560/025* (2013.01); *F01N 2560/06* (2013.01); *F01N 2900/0416* (2013.01); *F01N 2900/0601* (2013.01); *F01N 2900/1404* (2013.01); *F01N 2900/1621* (2013.01);

(Continued)

(58) Field of Classification Search
USPC ......... 60/274, 276, 286, 295, 297, 301, 303, 60/311
See application file for complete search history.

(56) References Cited

U.S. PATENT DOCUMENTS

| | | | |
|---|---|---|---|
| 6,269,633 B1 * | 8/2001 | van Nieuwstadt | ...... F01N 3/208 60/277 |
| 9,551,249 B2 * | 1/2017 | Argolini | ................ F01N 13/009 |

(Continued)

OTHER PUBLICATIONS

Great Britain Patent Office, Great Britain Search Report for Great Britain Application No. 1514392.8, dated Jan. 25, 2016.

*Primary Examiner* — Binh Q Tran
(74) *Attorney, Agent, or Firm* — Lorenz & Kopf, LLP

(57) ABSTRACT

A method is disclosed for operating an automotive system having an internal combustion engine equipped with an exhaust gas aftertreatment system including a Lean $NO_x$ Trap (LNT) upstream of a Selective Catalytic Reduction washcoated particulate filter (SCRF). A LNT inlet temperature is monitored. A parameter representative of a quantity of $NO_x$ stored in the LNT is also monitored. A map correlating the LNT inlet temperature and the quantity of $NO_x$ stored in the LNT is used to estimate an ammonia quantity produced during a LNT regeneration. A LNT regeneration is performed, if the estimated ammonia quantity is greater than a threshold value thereof.

9 Claims, 5 Drawing Sheets

(51) Int. Cl.
*F01N 3/035* (2006.01)
*F02D 41/02* (2006.01)
*F01N 3/20* (2006.01)
*F01N 9/00* (2006.01)

(52) U.S. Cl.
CPC .. *F01N 2900/1622* (2013.01); *F02D 41/0235* (2013.01); *F02D 2200/0802* (2013.01); *F02D 2200/0806* (2013.01); *F02D 2200/0811* (2013.01); *Y02T 10/24* (2013.01); *Y02T 10/47* (2013.01)

(56) References Cited

U.S. PATENT DOCUMENTS

| | | | |
|---|---|---|---|
| 9,551,252 B2* | 1/2017 | Park | F01N 3/208 |
| 9,567,888 B2* | 2/2017 | Gupta | F01N 3/208 |
| 2004/0055281 A1 | 3/2004 | Tang et al. | |
| 2006/0179825 A1 | 8/2006 | Hu et al. | |
| 2007/0079603 A1 | 4/2007 | Hu et al. | |
| 2013/0067894 A1* | 3/2013 | Stewart | F01N 3/208 60/295 |
| 2015/0143798 A1* | 5/2015 | Lee | F02D 41/1446 60/274 |

\* cited by examiner

METHOD OF OPERATING AN AUTOMOTIVE SYSTEM

CROSS-REFERENCE TO RELATED APPLICATION

This application claims priority to British Patent Application No. 1514392.8, filed Aug. 13, 2015, which is incorporated herein by reference in its entirety.

TECHNICAL FIELD

The present disclosure pertains to a method of operating an automotive system.

BACKGROUND

Conventionally internal combustion engines are equipped with exhaust gas aftertreatment systems. One of the functions of the aftertreatment systems in case of Diesel engines is the treatment of $NO_X$ emission, considering that it is required by current and future legislation, to reach very stringent emission targets in terms of $NO_X$ quantity.

Several aftertreatment systems have been proposed to reach such targets, one of which is an aftertreatment system including a Lean $NO_X$ Trap upstream of an SCRF. As known, a Lean $NO_X$ Trap (LNT) is a device that is used to reduce nitrogen oxides (NO and $NO_2$) and is a catalytic converter support coated with a special washcoat containing zeolites, while a SCRF is a passive SCR (Selective Catalytic Reduction) catalyst coated on a porous DPF (Diesel Particular Filter). Lean $NO_X$ Traps (LNT) are subjected to periodic regenerations to release and reduce the trapped nitrogen oxides ($NO_X$) from the LNT.

In order to perform a regeneration event, also referenced as a $DeNO_X$ regeneration, Lean $NO_X$ Traps (LNT) are operated cyclically, for example by switching the engine from a lean burn operation to a rich operation. Known LNT control strategies are designed to manage $DeNO_X$ regenerations of the LNT as a function of air-to-fuel ratios in the exhaust gas, also known as lambda. In particular, known strategies request a $DeNO_X$ regeneration if the LNT $NO_X$ conversion efficiency is lower than a predefined threshold thereof, namely if the $NO_X$ quantity stored in the LNT is greater than a predefined threshold. Once requested, a $DeNO_X$ regeneration is ended when a lambda signal breakthrough is verified, namely at the instant in which an air-to-fuel ratio at an LNT outlet is lower than an air-to-fuel ratio at an LNT inlet.

It is also known that the LNT has the capability of producing ammonia ($NH_3$) during a regeneration event. Ammonia is used by the SCRF downstream of the LNT to improve the total $NO_X$ conversion efficiency.

SUMMARY

In accordance with the present disclosure a strategy is provided that enhances the total $NO_X$ conversion efficiency. An embodiment of the disclosure provides a method of operating an automotive system, e.g. a passenger car, the automotive system equipped with an internal combustion engine, e.g. a Diesel engine, equipped with an exhaust gas aftertreatment system, the aftertreatment system including a Lean $NO_X$ Trap (LNT) upstream of and possibly close-coupled to a Selective Catalytic Reduction washcoated particulate filter (SCRF). A LNT inlet temperature is monitored by performing a measurement with a temperature sensor. A parameter representative of a quantity of $NO_X$ stored in the LNT is monitored, which can be done by measuring with a dedicated $NO_X$ sensor. A map correlating the LNT inlet temperature and the quantity of $NO_X$ stored in the LNT is used with a controller such as an ECU to estimate ammonia quantity produced during a LNT regeneration. A LNT regeneration is performed, if the estimated ammonia quantity is greater than a threshold value thereof. The proposed strategy is able to trigger a rich $DeNO_X$ event in operating conditions of the internal combustion engine when the LNT is capable to produce a large amount of ammonia. A greater quantity of ammonia in the SCRF however increases the overall $NO_X$ conversion efficiency.

According to an embodiment of the present disclosure, the LNT regeneration is performed at a predefined value of an air-to-fuel ratio at an LNT inlet. An effect of this embodiment is that an optimal value of an air-to-fuel ratio at an LNT inlet can be chosen that is best for ammonia production by the LNT during regeneration, depending on automotive system conditions.

According to an embodiment of the present disclosure, the LNT regeneration is performed if the ammonia storage capacity of the SCRF is not exceeded. This provides a limiting factor to avoid a fuel-consuming LNT regeneration in all situations in which the SCRF cannot accommodate any produced ammonia.

According to an embodiment of the present disclosure, the LNT regeneration is performed if the probability of completion of the regeneration is greater than a threshold value thereof. This allows avoiding an incomplete LNT regeneration, an event which leads to a higher fuel consumption of the vehicle.

According to another embodiment of the present disclosure, the LNT regeneration is performed if the soot quantity stored in the SCRF does not exceed a predefined value thereof if an air-to-fuel ratio at an LNT inlet is equal to a fixed and e.g. predefined value, such as 0.92 for example. Since the regeneration of ammonia depends on the lambda value this value can be chosen to optimize ammonia production. Furthermore, at lambda equal to 0.92 the LNT is known to produce a substantial quantity of ammonia, which provides an helpful criterion to decide if it is worthwhile to perform a regeneration.

According to an embodiment of the present disclosure, the LNT regeneration is performed if the $NO_X$ conversion efficiency of the LNT is greater that a minimum value thereof. This provides a criterion to perform a LNT regeneration in all conditions in which the $NO_X$ conversion efficiency is sufficiently high to guarantee an efficient use of the produced ammonia in the SCRF to purify the exhaust gases.

According to an embodiment of the present disclosure, the LNT regeneration is continued after a predefined amount of time after an air-to-fuel ratio at an LNT outlet is lower than an air-to-fuel ratio at an LNT inlet. An effect of this embodiment is that it allows increasing ammonia production.

Another aspect of the present disclosure provides an apparatus for operating an automotive system, the automotive system including an internal combustion engine, e.g. a Diesel engine, equipped with an exhaust gas aftertreatment system, the aftertreatment system including a Lean $NO_X$ Trap (LNT) upstream of a Selective Catalytic Reduction washcoated particulate filter (SCRF). The apparatus includes a sensor, electronic control unit or other means configured to monitor a LNT inlet temperature, a sensor, electronic control unit or other means configured to monitor a parameter representative of a quantity of $NO_X$ stored in the LNT; an electronic control unit or other means configured to use a map correlating the LNT inlet temperature and the quantity of $NO_X$ stored in the LNT (510) to determine an ammonia quantity produced during a LNT regeneration at such values of the LNT inlet temperature and of the parameter representative of a quantity of $NO_X$ stored in the LNT (510), and an electronic control unit or other means for performing a LNT regeneration, if the estimated ammonia quantity is greater than a threshold value thereof. This aspect has similar effects with respect to the previous embodiment, namely it is able to request a rich $DeNO_X$ event when the LNT is capable to maximize ammonia production. A greater quantity of ammonia in the SCRF increases overall $NO_X$ conversion efficiency.

According to an aspect of the present disclosure, the apparatus includes an electronic control unit or other means to perform a LNT regeneration at a predefined value of an air-to-fuel ratio at an LNT inlet. An effect of this embodiment is that an optimal value of an air-to-fuel ratio at an LNT inlet can be chosen that is best for ammonia production by the LNT during regeneration, depending on automotive system conditions.

According to an aspect of the present disclosure, the apparatus includes an electronic control unit or other means to perform the LNT regeneration if the ammonia storage capacity of the SCRF is not exceeded. This provides a limiting factor to avoid a fuel-consuming LNT regeneration in all situations in which the SCRF cannot accommodate any produced ammonia.

According to an aspect of the present disclosure, the apparatus includes an electronic control unit or other means to perform the LNT regeneration if the probability of completion of the regeneration is greater than a threshold value thereof. An effect of this aspect is that it avoids a fuel-consuming LNT regeneration.

According to another aspect of the present disclosure, the apparatus includes an electronic control unit or other means to perform the LNT regeneration if the soot quantity stored in the SCRF does not exceed a predefined value thereof if an air-to-fuel ratio at an LNT inlet is equal to 0.92. An effect of this aspect is that, since a regeneration at lambda equal to 0.92 is known to produce a substantial quantity of ammonia, it provides a helpful criterion to decide if it is worthwhile to perform a regeneration.

According to an aspect of the present disclosure, the apparatus includes an electronic control unit or other means to perform the LNT regeneration if the $NO_X$ conversion efficiency of the LNT is greater that a minimum value thereof. This provides a criterion to perform a LNT regeneration in all conditions in which the $NO_X$ conversion efficiency is sufficiently high to guarantee an efficient use of the produced ammonia in the SCRF to purify the exhaust gases.

According to an aspect of the present disclosure, the apparatus includes an electronic control unit or other means to continue the LNT regeneration the LNT regeneration after a predefined amount of time after an air-to-fuel ratio at an LNT outlet is lower than an air-to-fuel ratio at an LNT inlet. This allows increasing ammonia production.

The method according to one of its aspects can be carried out with the help of a computer program including a program-code for carrying out the method described above, and in the for in of computer program product including the computer program. The computer program product can be part of a control apparatus for an internal combustion engine, the control apparatus including an Electronic Control Unit (ECU), a data carrier associated with the ECU, and the computer program stored in the data carrier. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
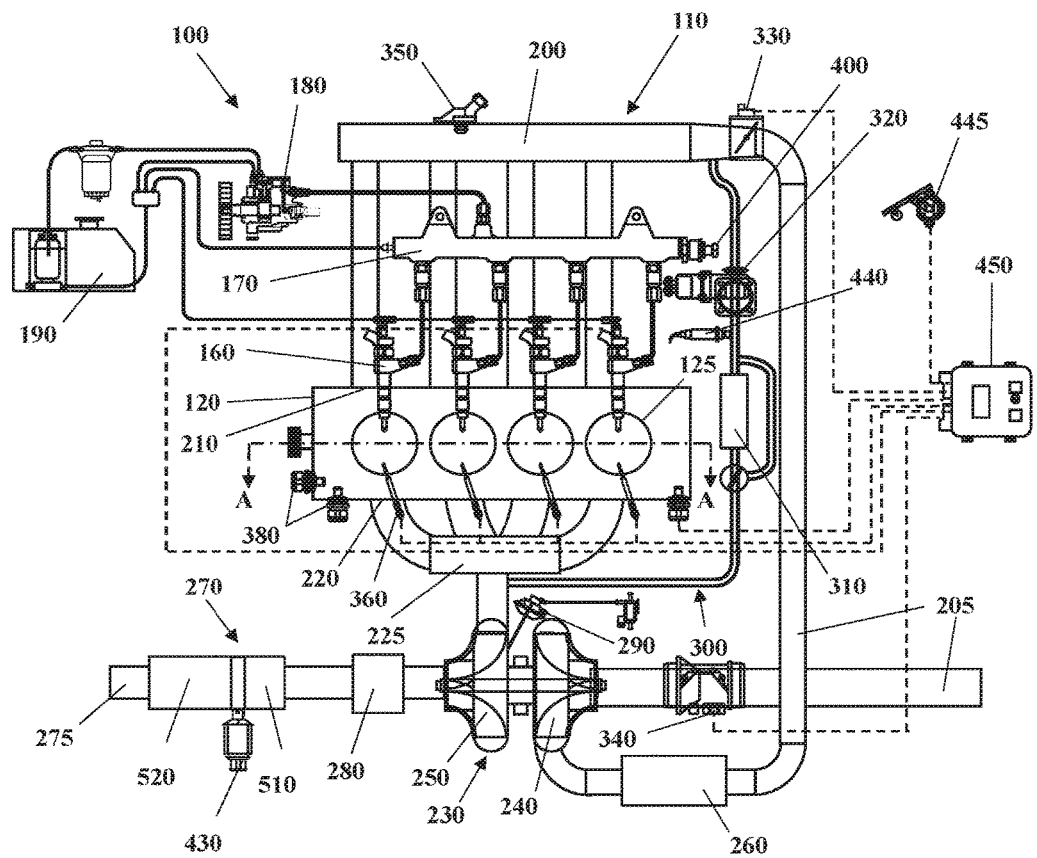
FIG. 1 shows an automotive system.
Figure 2:
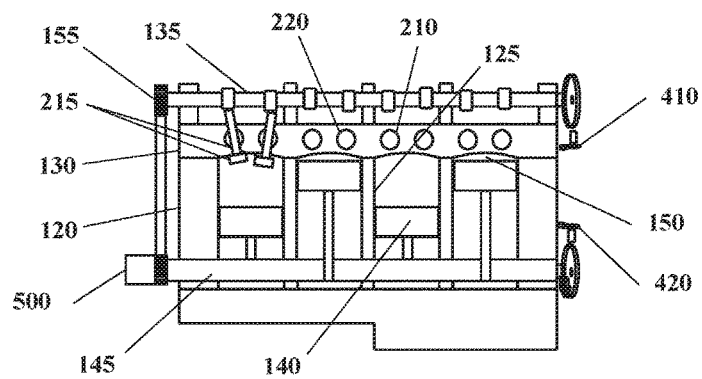
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_X$ traps, hydrocarbon adsorbers, selective catalytic reduction (SCR) systems, and particulate filters, such as a Diesel Particulate Filter (DPF). In particular, the aftertreatment system 270 includes a lean $NO_X$ trap (INT) 510 and a Selective Catalytic Reduction on Filter (SCRF) 520 which are better described with reference to FIG. 3. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system s transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of a conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
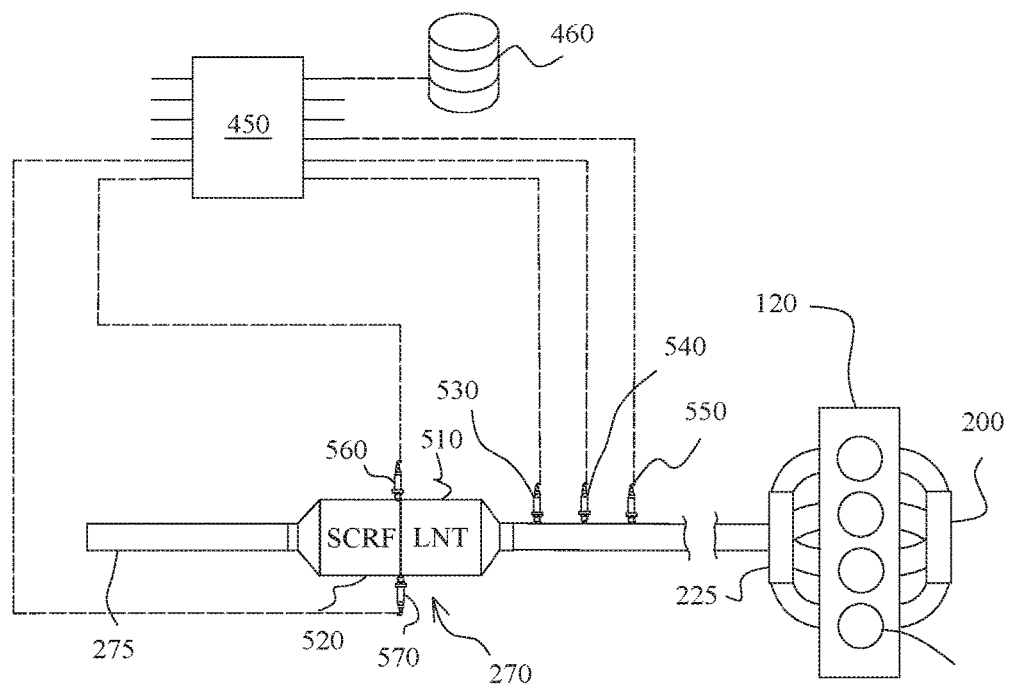
FIG. 3 shows a schematic view of a portion of an aftertreatment system for an internal combustion engine.

FIG. 3 shows a schematic view of a portion of an aftertreatment system 500 for the internal combustion engine 110. In the aftertreatment system 270, a temperature sensor 530 at a LNT inlet is represented along with a lambda sensor 540 at a LNT inlet and a lambda sensor 560 at a LNT outlet. Both lambda sensors 540, 550 may generate a voltage based on the Oxygen concentration in the exhaust gas and are therefore suitable for measuring a parameter representative of air-to-fuel ratios in the exhaust gas, namely lambda ($\lambda$), which is defined as air-to-fuel ratio divided by stoichiometric air-to-fuel ratio.

Furthermore, the aftertreatment system 270 may include a $NO_X$ quantity sensor 550 upstream of the LNT 510 and a $NO_X$ quantity sensor 570 downstream of the LNT 510. It has been observed that, during a $DeNO_X$ regeneration of a Lean $NO_X$ Trap (LNT), a certain amount of ammonia ($NH_3$) is produced and then stored inside the SCRF 520 downstream of the LNT 510. Such ammonia is used by the SCRF 520 to increase overall $NO_X$ conversion efficiency. The SCRF $NO_X$ conversion efficiency is therefore a function of capability by the LNT 510 to produce $NH_3$.

Table 1 summarizes the relevant phenomena due to the interrelation between the LNT 510 and SCRF 520:

TABLE 1

| Driving Mode | LNT | SCRF |
| --- | --- | --- |
| Lean | $NO_x$ storage | Not Applicable |
| Rich | $NO_x$ Conversion with $NH_3$ formation | $NH_3$ Storage |
| Lean | $NO_x$ Storage | $NO_x$ Conversion via passive SCR |

Several parameters have a great impact on the production of ammonia by the LNT 510. Some of them are directly controllable as the lambda set point for $DeNO_X$ combustion mode management. Other parameters, such the temperature at LNT inlet and $NO_X$ storage in the LNT 510, are not controllable since they depend on driving conditions.

In any case, $NO_X$ storage in the LNT 510 may be estimated by reading the signals from the $NO_x$ sensor 550 upstream of the LNT 510 and the $NO_x$ sensor 570 downstream of the LNT 510. In order to understand the optimal conditions for ammonia production by the LNT 510, a full characterization of this phenomenon has been performed in order to properly calibrate the strategy.

Figure 4:
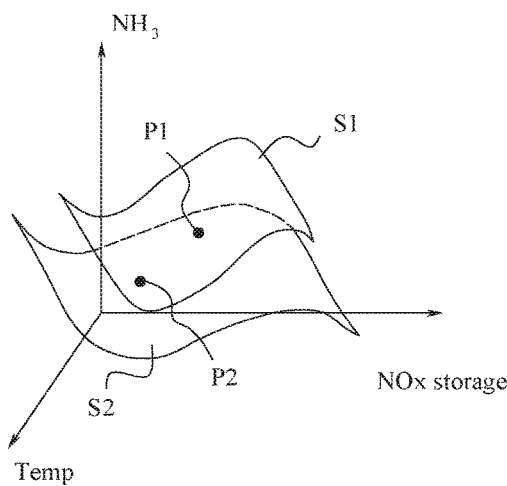
FIGS. 4 and 5 are maps of ammonia production by the LNT as a function of LNT inlet temperature and of $NO_X$ quantity stored in the LNT for different values of lambda.
Figure 5:
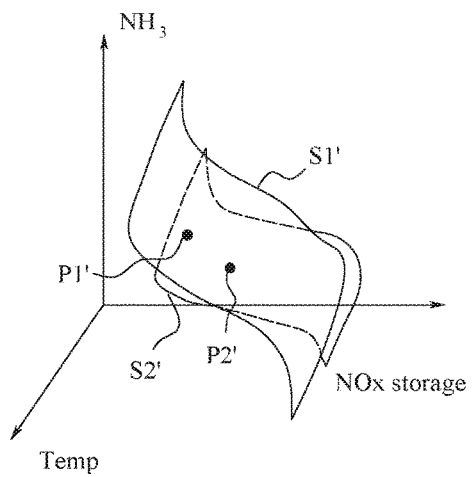

FIGS. 4 and 5 are maps of ammonia production by the LNT 510 as a function of LNT inlet temperature and $NO_x$ quantity stored in the LNT 510 for different values of lambda. In particular, the map of FIG. 4 represents ammonia production by the LNT with lambda having a value of 0.92 and the map of FIG. 5 represents ammonia production by the LNT 510 with lambda having a value of 0.95. These maps are determined by means of an experimental activity and are used in the various embodiments of the present disclosure, as detailed hereinafter.

More specifically, an experimental activity has been performed to characterize ammonia by the LNT 510 during a $DeNO_x$ regeneration event, in terms of physical conditions as the temperature at the inlet of the LNT 510 and of $NO_x$ storage in the LNT 510, with and without Sulphur. Other parameters, such as exhaust gas space velocity and $NO_x$ engine out emissions have been considered negligible for this study. Such experimental activity takes the form of the following calibration procedure.

At first, a stable value of the temperature at the inlet of the LNT 510 is obtained. Then a $DeNO_x$ wobbling procedure is performed in order to empty the LNT 510, where a wobbling procedure indicates a series of several rich combustion phases executed at high temperature, each rich combustion phase being followed by a lean combustion phase. The engine 110 has been motored to lower the temperature and suddenly energized to come back to the selected operating point to have a proper temperature.

A $NO_x$ loading phase is then performed until the $NO_x$ storage value read on an emission bench reaches a predefined setpoint. $DeNO_x$ events have been performed at two different values of lambda, namely at lambda equal to 0.92 (FIG. 4) and at lambda equal 0.95 (FIG. 5) in order to obtain respective maps. The end criteria for each $DeNO_X$ event is the customary lambda breakthrough.

During this procedure, the ammonia production has been measured with a suitable instrument such as a Fourier Transform Infrared Spectroscopy (FUR) analyzer.

More in particular, in FIG. 4 a first map is represented correlating the LNT inlet temperature and the quantity of $NO_X$ stored in the LNT 510 with an ammonia quantity produced during a LNT regeneration at lambda set to 0.92. Two surfaces are represented, surface S1 has been determined with no Sulphur content in the exhaust gas, while surface S2 has been determined with a predefined Sulphur content in the exhaust gas. For each couple of values of LNT inlet temperature and of $NO_X$ quantity stored in the LNT 510 exemplary points P1, P2 representing ammonia quantity produced at those conditions have been plotted on respective surfaces S1 and S2.

In FIG. 5 a second map is represented correlating the LINT inlet temperature and the quantity of $NO_X$ stored in the LNT 510 with an ammonia quantity produced during a LNT regeneration at lambda set to 0.95. As in the case of FIG. 4, two surfaces are represented, surface S1' has been determined with no Sulphur content in the exhaust gas, while surface S2' has been determined with a predefined Sulphur content in the exhaust gas. For each couple of values of LNT inlet temperature and of $NO_X$ quantity stored in the LNT 510 exemplary points P1', P2' representing ammonia quantity produced at those conditions have been plotted on respective surfaces S1' and S2'.

Figure 6:
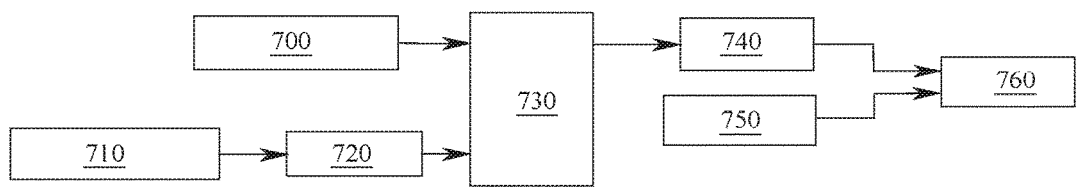
FIG. 6 is a block scheme of the logic of an embodiment of the present disclosure.

FIG. 6 is a block scheme of the logic of an embodiment of the present disclosure. In FIG. 6, block 700 generically represents prior art criteria to start a $DeNO_x$ regeneration of the 510. In particular, known criteria request a $DeNO_X$ regeneration if the LNT $NO_x$ conversion efficiency is lower than a predefined threshold thereof. Once requested, a $DeNO_X$ regeneration is ended when a lambda signal breakthrough is verified, namely at the instant in which an air-to-fuel ratio at an LNT outlet is lower than an air-to-fuel ratio at an LNT inlet.

According to the various embodiments of the present disclosure, optimal ammonia production criteria (block 710) to start a $DeNO_X$ regeneration of the LNT 510 have been added. In particular, such criteria involve using one of the maps of FIG. 4 or of FIG. 5 correlating the LNT inlet temperature and the quantity of $NO_X$ stored in the LNT 510 to estimate an ammonia quantity produced during a LNT regeneration and to perform a LNT regeneration, if the estimated ammonia quantity is greater than a threshold value thereof. The performance of the LNT regeneration is, however, limited or inhibited according to one or more of the following criteria (block 720). For example, the LNT regeneration is performed if an ammonia storage capacity of the SCRF 520 is not exceeded.

On the contrary, if the ammonia storage capacity of the SCRF 520 is exceeded, the LNT regeneration is not performed and this limitation helps to avoid a fuel-consuming LNT regeneration in all situations in which the SCRF would not accept a sufficient quantity of ammonia. Moreover, the LNT regeneration is performed if a probability of completion of the regeneration is greater than a threshold value thereof. On the contrary, if the probability of completion of the regeneration is lower than a threshold value thereof, the LNT regeneration is not performed and this limitation also helps to avoid a fuel-consuming, LNT regeneration.

Another limitation criterion provides that the LNT regeneration is not performed if the soot loading of the SCRF does exceed a threshold value thereof at lambda equal to 0.92. Since a regeneration at lambda equal to 0.92 is known to produce a substantial quantity of soot, it is helpful to decide if it is worthwhile to perform a regeneration in these conditions.

Finally, as another limitation, the LNT regeneration is not performed if the $NO_x$ conversion efficiency of the LNT is lower than a minimum value thereof. Such limitation provides a criterion to perform a LNT regeneration in all conditions in which the NOx conversion efficiency of the LNT guarantee a benefit versus the costs of an increased fuel consumption. Then the ECU 450 evaluates, for the current LNT inlet temperature and LNT $NO_x$ storage value, the best lambda value (0.92 or 0.95) to use during rich condition in order to have the best ammonia production (block 730). Such evaluation can be made also by using the maps of FIGS. 4 and 5.

Generally speaking, it is preferable to perform a regeneration at lambda set at 0.95, because it produces less soot than at lambda 0.92, but in some cases it may turn out from reading the above maps that the best ammonia production is reached with lambda set at 0.92 and thus the strategy prefers such value of lambda. Once the best value of lambda has been chosen, the $DeNO_x$ regeneration is performed (block 740) and is ended according to the lambda breakthrough criterion (block 760).

Nevertheless, in some circumstances, the DeNO$_x$ regeneration can be prolonged or continued for a limited amount of time beyond the occurrence of the lambda breakthrough condition if, based on the LNT inlet temperature and LNT NO$_x$ storage value, a considerably better ammonia production is foreseen. The duration of this prolonged phase is evaluated at block 750 and it may extend for some seconds depending on the conditions of the automotive system 100.

Figure 7:
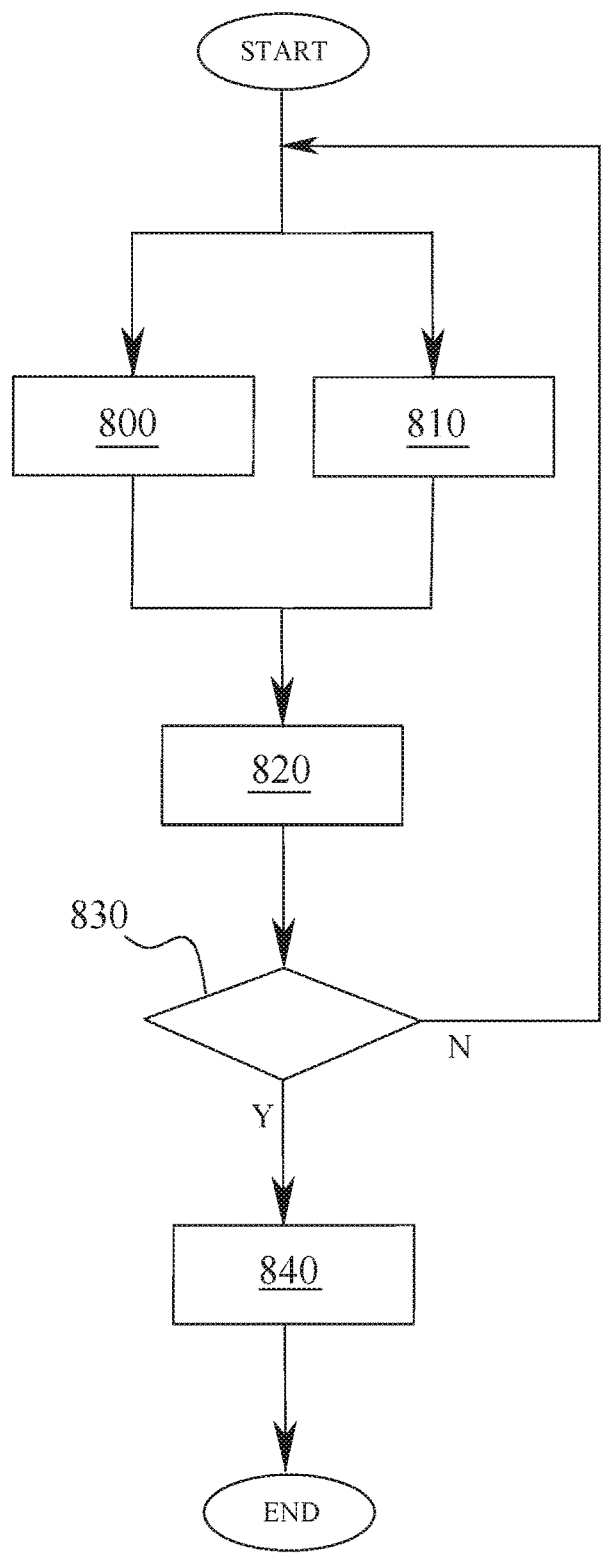
FIG. 7 is a flowchart representing an embodiment of the present disclosure.

FIG. 7 is a flowchart representing an embodiment of the present disclosure as performed by the ECU 450. A first step of the method is to monitor the LNT inlet temperature (block 800). Then a parameter representative of a quantity of NO$_X$ stored in the LNT 510 is monitored (block 810). The values of the LNT inlet temperature and of the quantity of NO$_X$ stored in the LNT are used as input of the maps to estimate an ammonia quantity produced during a LNT regeneration (block 820). A check is then made to verify if the estimated ammonia quantity is greater than a threshold value thereof (block 830). In the affirmative case, a LNT DeNO$_x$ regeneration is initiated (block 840).

From the above description it can be seen that an effect of the various embodiments is that the proposed strategy is able to request a rich DeNO$_x$ event when the LNT is capable to maximize the NH$_3$ production as a function of the ammonia maps that have been experimentally predetermined.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an automotive system having an internal combustion engine equipped with an exhaust gas aftertreatment system including a lean NOx trap upstream of a particulate filter with a selective catalytic reduction, the method comprising:
   monitoring, by a first sensor, an inlet temperature of the lean NOx trap;
   monitoring, by a second sensor, a parameter representative of a quantity of NOx stored in the lean NOx trap;
   determining, by an electronic control unit controlling a lean NOx trap regeneration of the exhaust gas aftertreatment system, using a map correlating the lean NOx trap inlet temperature and the quantity of NOx stored in the lean NOx trap an ammonia quantity that would be produced during a lean NOx trap regeneration at such values of the lean NOx trap inlet temperature and of the parameter representative of a quantity of NOx stored in the lean NOx trap; and
   performing, by the exhaust gas aftertreatment system, the lean NOx trap regeneration when the determined ammonia quantity is greater than a threshold value thereof.

2. The method according to claim 1, further comprising performing the lean NOx trap regeneration at a predefined value of an air-to-fuel ratio at an inlet of the lean NOx trap.

3. The method according to claim 1, further comprising performing the lean NOx trap regeneration when an ammonia storage capacity of the particulate filter is not exceeded.

4. The method according to claim 1, further comprising performing the lean NOx trap regeneration when a probability of completion of the regeneration is greater than a threshold value thereof.

5. The method according to claim 1, further comprising performing the lean NOx trap regeneration when the soot quantity stored in the particulate filter does not exceed a predefined value thereof when an air-to-fuel ratio at an inlet of the lean NOx trap is equal to 0.92.

6. The method according to claim 1, further comprising performing the lean NOx trap regeneration when a NOx conversion efficiency of the lean NOx trap is greater that a minimum value thereof.

7. The method according to claim 1, further comprising continuing the lean NOx trap regeneration for a predefined amount of time after an air-to-fuel ratio at an outlet of the lean NOx trap is lower than an air-to-fuel ratio at an inlet of the lean NOx trap.

8. An exhaust gas aftertreatment system for an internal combustion engine in an vehicle comprising:
   a particulate filter having a selective catalytic reduction washcoat;
   a lean NOx trap upstream of the particulate filter; and
   an electronic control unit for controlling a regeneration of the exhaust gas aftertreatment system, the electronic control unit configured to:
     monitor a lean NOx trap inlet temperature;
     monitor a parameter representative of a quantity of NOx stored in the lean NOx trap;
     use a map correlating the lean NOx trap inlet temperature and the quantity of NOx stored in the lean NOx trap to determine an ammonia quantity produced during a lean NOx trap regeneration at such values of the lean NOx trap inlet temperature and of the parameter representative of a quantity of NOx stored in the lean NOx trap; and
     performing a lean NOx trap regeneration when the estimated ammonia quantity is greater than a threshold value thereof.

9. An exhaust gas aftertreatment system for an internal combustion engine in an vehicle comprising:
   a particulate filter having a selective catalytic reduction washcoat;
   a lean NOx trap upstream of the particulate filter; and
   an electronic control unit for controlling a regeneration of the exhaust gas aftertreatment system, the electronic control unit configured to:
     monitor a lean NOx trap inlet temperature;
     monitor a parameter representative of a quantity of NOx stored in the lean NOx trap;
     determine a probability of completing a lean NOx trap regeneration by determining an ammonia quantity that would be produced during a lean NOx trap regeneration at the monitored lean NOx trap inlet temperature and monitored parameter representative of the quantity of NOx stored in the lean NOx trap using a map correlating the lean NOx trap inlet temperature and the quantity of NOx stored in the lean NOx trap; and
     performing the lean NOx trap regeneration when the probability of completing the lean NOx trap regeneration is greater than a predetermined threshold.

* * * * *